United States Patent Office 3,485,582
Patented Dec. 23, 1969

3,485,582
PROCESS FOR THE PREPARATION OF HYDRAZINE FROM METHYLETHYL- OR DIETHYL-KETAZINE
Rudolf Mundil, Leverkusen, Germany, assignor to Farbenfabriken Bayer Aktiengesellschaft, Leverkusen, Germany, a corporation of Germany
No Drawing. Filed Dec. 12, 1967, Ser. No. 689,756
Claims priority, application Germany, Dec. 17, 1966, F 50,990
Int. Cl. C01b $21/16$
U.S. Cl. 23—190                                  6 Claims

ABSTRACT OF THE DISCLOSURE

Recovery of hydrazine from aqueous ketazine solution by separation of the more readily volatile components by distillation, e.g. at about normal pressure, in which the ketazine is a higher ketazine, e.g. methylethyl ketazine or diethyl ketazine, whereby to increase the concentration of the hydrazine content in the distillate without reducing the hydrazine yield and permit subsequent hydrolysis of condensed distillate to eliminate the corresponding higher ketone for isolation of the desired hydrazine.

---

This invention relates to a process for the preparation of hydrazine.

It has been known for some considerable time that, following the addition of acetone to aqueous solutions containing hydrazine hydrate and then distilling, the hydrazine present in the distillate in the form of compounds of acetone and hydrazine undergoes an increase in concentration. These compounds boil at lower temperatures than water. It has also been possible to develop this phenomenon into an industrially useful process. In this process, as described in U.S. Patent 3,028,316, the aqueous hydrazine-containing solution and acetone are combined until an equilibrium is adjusted, the more readily volatile components enriched in hydrazine are distilled off in a column in the form of their acetone compounds and the residual fraction is transferred from the lower end of this column to an intermediate vessel where it is recombined with fresh acetone until an equilibrium is again adjusted and again a hydrazine-rich vapour can be obtained. This cycle involving the supply of fresh acetone, the adjustment of an equilibrium and the separation of the more readily volatile components in a column is repeated until an almost hydrazine-free solution runs off from the lower end of the last column. A separation improvement in such recovery using a tray column is disclosed in copending U.S. patent application Ser. No. 690,017, filed simultaneously herewith.

In addition, Raschig's synthesis of hydrazine, the application of which on an industrial scale involves considerable difficulties on account of its high sensitivity to heavy metal ions and the secondary reactions taking place at the same time, has been successfully modified by the direct formation of aqueous solutions of ketazines by the addition of ketones such as acetone, for example, during the reaction of ammonia and chloramine. The ketazines are distinguished by a much greater stability to oxidation so that they can be produced much more economically than hydrazine.

The processes for the production of ketazines were originally limited to the use of acetone as the ketone, although it had been found that higher ketones were also capable of economically forming ketazines in the reaction with ammonia and chloramine. The reason for this limitation to the use of acetone was that unsuccessful attempts had been made to extend the enrichment of hydrazine by distillation from aqueous hydrazine hydrate solutions containing acetone (see U.S. Patent 2,955,921) to other additives. It was thought that only by using compounds with a lower molecular weight than acetone would it be possible to obtain even lower boiling compounds containing hydrazine and therefore that higher ketazine distillation would be undesirable. Similar unsuccessful tests were conducted, for example, with acetaldehyde and formaldehyde.

A process for the recovery of hydrazine from an aqueous ketazine solution by separating the more readily volatile components has now been found in which an aqueous solution of methylethylketazine or diethyl ketazine is subjected to distillation, the hydrazine being isolated from the ketazine solution enriched by condensation from the vapour phase following a hydrolysis stage in which the ketone is eliminated.

In accordance with the present invention it has surprisingly now been found that, under otherwise the same conditions, the addition of methylethylketone or diethylketone instead of acetone to an aqueous hydrazine hydrate solution increases the concentration of hydrazine in the distillate to an extent far greater than that obtained with acetone. Only when methylisobutyl ketone is added is there any appreciable drop in the hydrazine concentration relatively to the acetone. This result places the synthesis of ketazines in a new light, particularly with regard to industrial operation, and broadens the range of economically applicable ketones. The higher ketones, methylethylketone and diethylketone, may be optionally present in a ratio of about 1.5 to 10 mols per mol of hydrazine or hydrazine hydrate, in the starting dilute aqueous higher ketazine solution being distilled.

The following applies to all the examples: To provide a comparison for the increases in concentration obtained, solutions of the same initial molar concentrations were synthetically prepared from hydrazine hydrate, ketone, sodium chloride and water. The residence time required for adjustment of an equilibrium was 20 minutes in each case after it had been found that residence times of 12 to 15 minutes produced lower levels of enrichment whilst residence times in excess of 20 minutes did not provide any increase. The same volume of liquid was distilled off from the synthetically prepared solution in each case and compared by measuring the amount of condensate accumulating from the steam used for heating so that similar quantities of heat were used for separation. The tests described in the examples were all carried out at normal pressure, separation being carried out at the lower end of the column without an attachment.

Example 1

10.0 g. (0.2 mol) of 100% hydrazine hydrate, 50 g. of sodium chloride, 22.0 g. of acetone, (0.38 mol) and 418.0 g. of water were introduced into a 1-litre capacity spherical flask, 100 ml. being distilled off through a distillation bridge. Analysis of the distillate showed a content of 6.0 g. of hydrazine hydrate and 18.13 g. of acetone. This corresponded to 60.0% of the hydrazine used and 82.4% of the acetone used.

Example 2

10.0 g. of 100% hydrazine hydrate, 50 g. of sodium chloride, 27.5 g. of methylethylketone, (0.38 mol) and 413 g. of water were combined, 100 ml. being distilled off. The distillate contained 7.63 g. of hydrazine hydrate or 76.3% of the quantity originally used, and 24.8 g. of methylethyl ketone or 90.5% of the input.

Example 3

10.0 g. of hydrazine hydrate, 50.0 g. of sodium chloride, 32.5 g. of diethylketone (0.38 mol) and 408 g. of water were combined, 100 ml. being distilled off. The distillate contained 6.3 g. of hydrazine hydrate (63.0% of the input) and 26.3 g. of diethylketone (81.0% of the input).

Example 4

The starting substances were hydrazine hydrate (10.0 g.), sodium chloride (50.0 g.), methylisobutyl ketone (38.5 g.) and water (402 g.). The first 100 ml. of distillate were found to contain 3.44 g. of hydrazine hydrate (34.4% of the input) and 36.2 g. of methylisobutylketone (92.8% of the input).

The above described examples set forth that the enrichment of hydrazine by distillation in the form of the ketazine is considerably improved if methylethyl ketone or diethyl ketone is used to form the corresponding ketazines.

Hydrazine is a very valuable product and in 1965 the overall productions capacity in the Free World Market was estimated to be as high as about 52 million lbs. per year calculated as 100% hydrazine hydrate—Chem. Ing., July 5, 1965, p. 38–40. A rather high amount is used as rocket-fuel either in the form of pure hydrazine or in the form of unsymmetrical dimethyl hydrazine. Otherwise hydrazine is used as intermediate in organic synthesis for the production of e.g. herbicides, pharmaceuticals, free-radical catalysts, plant grows inhibitors, oxygen scavengers, and blowing agents. Last but not least hydrazine is a well established additive for water treatment to prevent corrosion in steam boilers and the like.

Unfortunately the well known processes for the production of hydrazine: Raschig-process, urea-process or the modified Raschig-processes as described e.g. in U.S. Patents 2,993,758 or 3,077,383 or in German Patent 1,019,647, yield solutions with only small concentrations of hydrazine either in the form of the hydrate or in form of a ketazine, the concentrations being generally far below 10%. The hydrazine concentrations in the synthesis solution of the Raschig-process generally is not higher than 2%. This dilute hydrazine or ketazine solutions are to be upgraded in several steps comprising repeated distillations or other appropiate methods. The economy of a hydrazine process therefore depends highly on the efficiency of the purification and enrichment steps. Besides the sulfate route according to which the ammonia free synthesis liquor is mixed with sulfuric acid to precipitate the hydrazine in the form of the water-insoluble monohydrazine-disulfate which can be used as such or can be otherwise treated with sodium hydroxide solution to prepare hydrazine hydrate e.g. according to the process disclosed in copending U.S. patent application Ser. No. 689,768, filed simultaneously herewith, another preferred enrichment process comprises repeated distillations via the ketazines. The ketazines either prepared directly e.g., by the process disclosed in U.S. Patents 2,993,758 and 3,077,383, or by adding a ketone to the ammonia free synthesis solution of the Rachig- or urea-process in the first step are to be distilled to remove the ketazine together with the excess ketone from the major part of the water and the sodium chloride contained therein. The sodium salt is a by-product of the hydrazine formation from e.g., hydrochlorite and ammonia, or urea, hypochlorite and caustic-soda. Thereafter from the ketazine the excess ketone is to be separated thereby obtaining the starting enriched ketazine solution for the hydrazine ketone separation step. This separation step can be carried out by sulfuric acid treatment of the ketazine solution to form either the monohydrazine disulfate or the dihydrazine monosulfate. Preferably however the ketazine solution is fractionally distilled under hydrolyzing condition. Appropriate processes are described in U.S. Patent 3,189,411 or copending U.S. patent application Ser. No. 603,181. Besides the fractionated distillation under superatmospheric pressure as described in the aforementioned patents other processes are known, for instance the process as disclosed U.S. Patent 3,010,790, according to which the distillation is performed with the addition of acids to promote hydrolysis. Finally the separation of the hydrazine from the ketone may be achieved in the presence of a cation exchange resin which retains only the hydrazine. From the resin the hydrazine is then removed by an ammoniacal solution, U.S. Patent 3,332,739. The enriched hydrazine hydrate solution can be used as such or further concentrated by distillation up to the azeotrope containing about 70 weight percent of hydrazine.

Finally the hydrazine hydrate can be distilled in the presence of e.g. aniline to prepare pure hydrazine.

From the foregoing it is evident that many steps and especially repeated fractionated distillations are necessary to prepare the final product. Due to the fact that large quantities of liquids are involved containing only more or less small amounts of the desired end-product the efficffiency of the distillations must be as high as possible to reduce the energy demand which is the major expenditure of distillations. The process of invention now provides a substantial improvement in the hydrazine production or more specifically in the enrichment of aqueous ketazine solutions, wherein the hydrazine is separated from the synthesis solution in the form of a ketazine-ketone-water mixture, which then can be further treated as described above.

What is claimed is:

1. In the process for the recovery of hydrazine from an aqueous ketazine solution by separation of the more readily volatile liquid components by distilling an aqueous solution of a ketazine, recovering and condensing the resulting gas phase distillate to form an enriched concentration ketazine solution, fractionally distilling such enriched solution to remove the excess ketone, subjecting the fractionally distilled enriched solution to hydrolysis to form the corresponding ketone of the ketazine as well as hydrazine, and isolating the resultant hydrazine hydrate, the improvement which consists essentially of distilling, as the aqueous solution of a ketazine, an aqueous solution of a higher ketazine selected from the group consisting of methylethyl ketazine and diethyl ketazine, and recovering and condensing the resultant gas phase distillate to form such enriched concentration higher ketazine solution.

2. Improvement according to claim 1 wherein the aqueous solution being distilled contains between about 1.5–10 mols of the corresponding higher ketone selected from the group consisting of methyl ketone and diethyl ketone per mol of hydrazine hydrate present.

3. Improvement according to claim 1 wherein said higher ketazine is methylethyl ketazine.

4. Improvement according to claim 1 wherein said higher ketazine is diethylketazine.

5. In the process for the recovery of hydrazine from aqueous ketazine solution, the improvement for increasing the yield which comprises subjecting to normal pressure distillation a dilute aqueous solution of a higher ketazine selected from the group consisting of methylethyl ketazine and diethyl ketazine to recover as distillate an enriched concentration higher ketazine solution.

6. Improvement according to claim 5 wherein said dilute aqueous solution correspondingly contains between abot 1.56–10 mols of the particular higher ketone selected from the group consisting of methylethyl ketone and diethyl ketone per mol of hydrazine hydrate present.

(References on following page)

References Cited

UNITED STATES PATENTS

| | | | |
|---|---|---|---|
| 3,028,316 | 4/1962 | Rahlfs et al. | 23—190 |
| 3,028,219 | 4/1962 | Rahlfs et al. | 23—190 |
| 3,010,790 | 11/1961 | Rahlfs et al. | 23—190 |

OSCAR R. VERTIZ, Primary Examiner
H. S. MILLER, Assistant Examiner

U.S. Cl. X.R.

203—14, 62

PO-1050
(5/69)

UNITED STATES PATENT OFFICE
CERTIFICATE OF CORRECTION

Patent No. 3,485,582           Dated December 23, 1969

Inventor(s)   RUDOLF MUNDIL

It is certified that error appears in the above-identified patent and that said Letters Patent are hereby corrected as shown below:

Column 7, line 26, "efficifiiency" should be --efficiency--
line 56, "methyl" should be --methylethyl--; line 71, "1.5t" should be --1.5--

SIGNED AND SEALED
MAY 12 1970

(SEAL)
Attest:

Edward M. Fletcher, Jr.
Attesting Officer

WILLIAM E. SCHUYLER, JR.
Commissioner of Patents